THIRD SPEED - DIRECT SPLIT TORQUE DRIVE

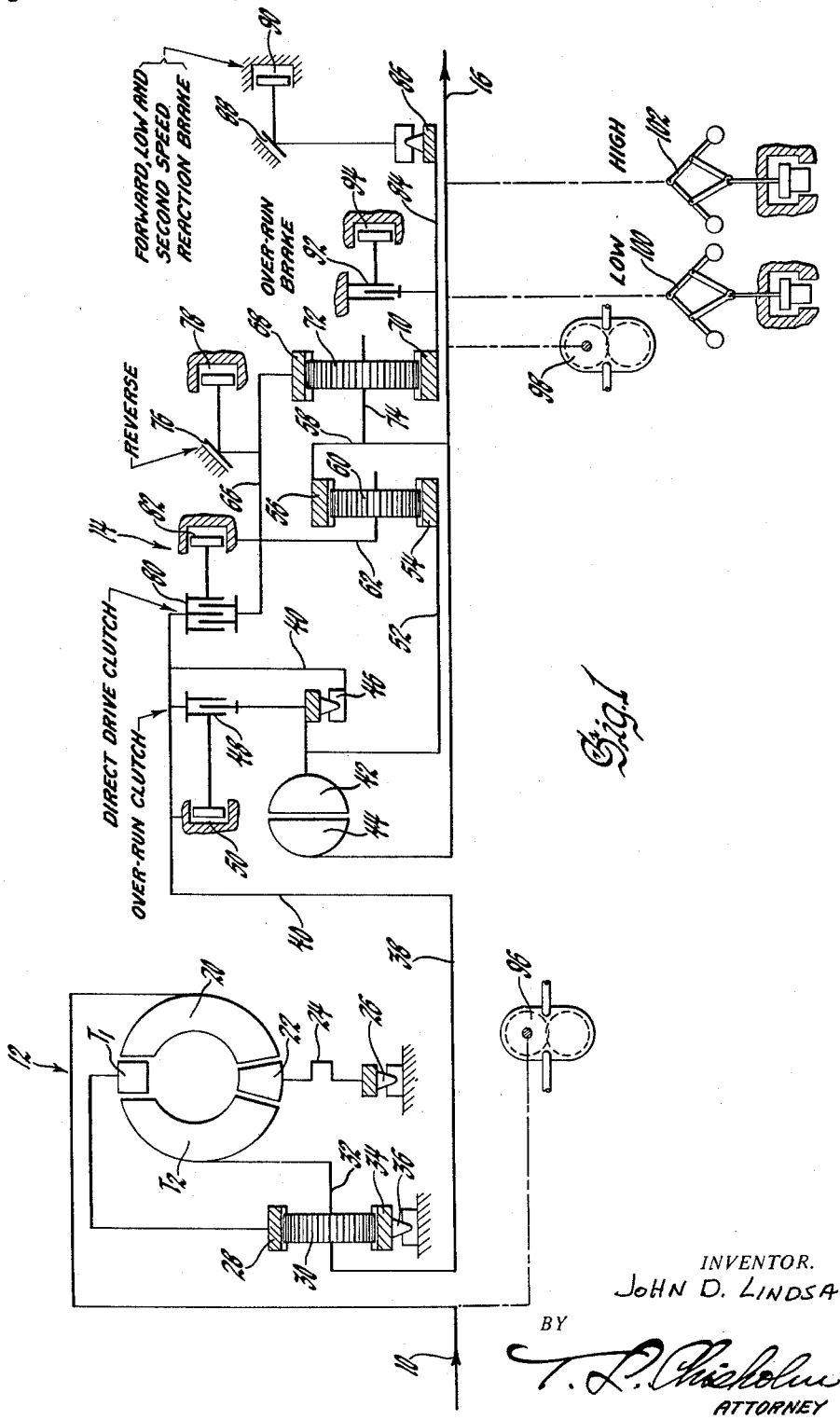

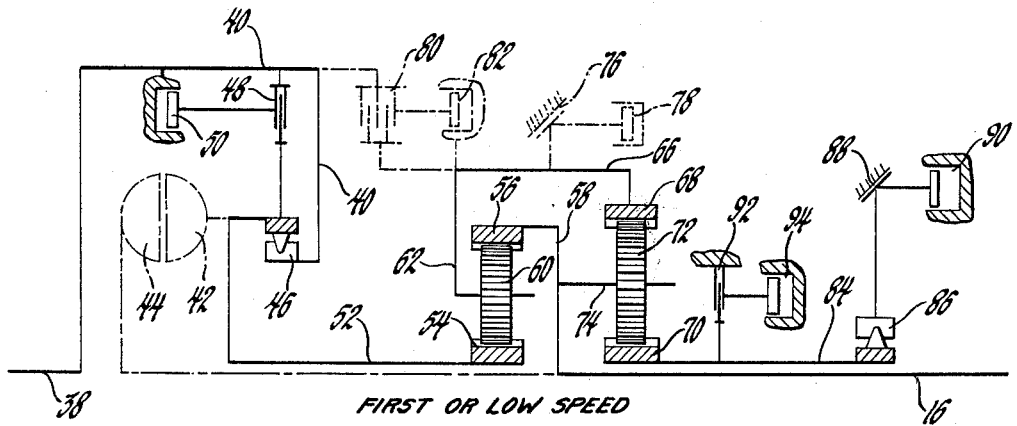
Fig. 2 — FIRST OR LOW SPEED
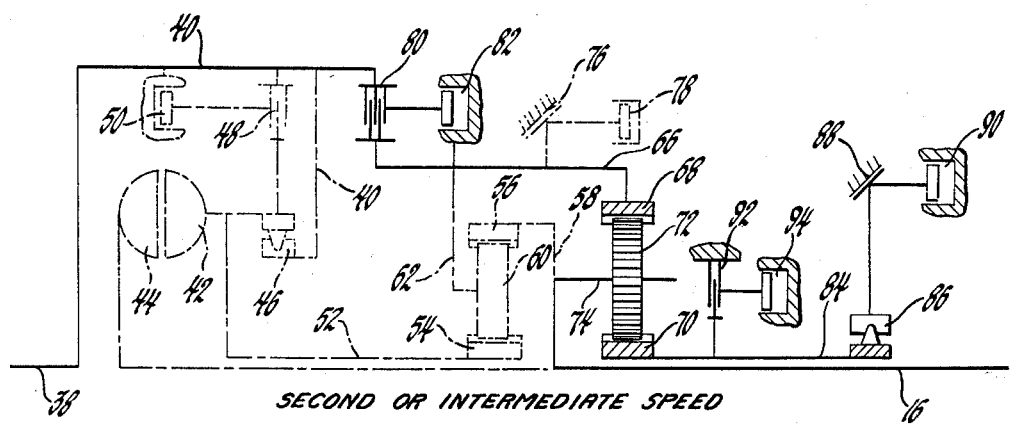
Fig. 3 — SECOND OR INTERMEDIATE SPEED
INVENTOR.
JOHN D. LINDSAY
ATTORNEY Feb. 12, 1963  J. D. LINDSAY  3,077,253
TRANSMISSION
Original Filed Nov. 28, 1958  8 Sheets-Sheet 3

REVERSE

INVENTOR.
JOHN D. LINDSAY
BY
T. L. Chisholm
ATTORNEY

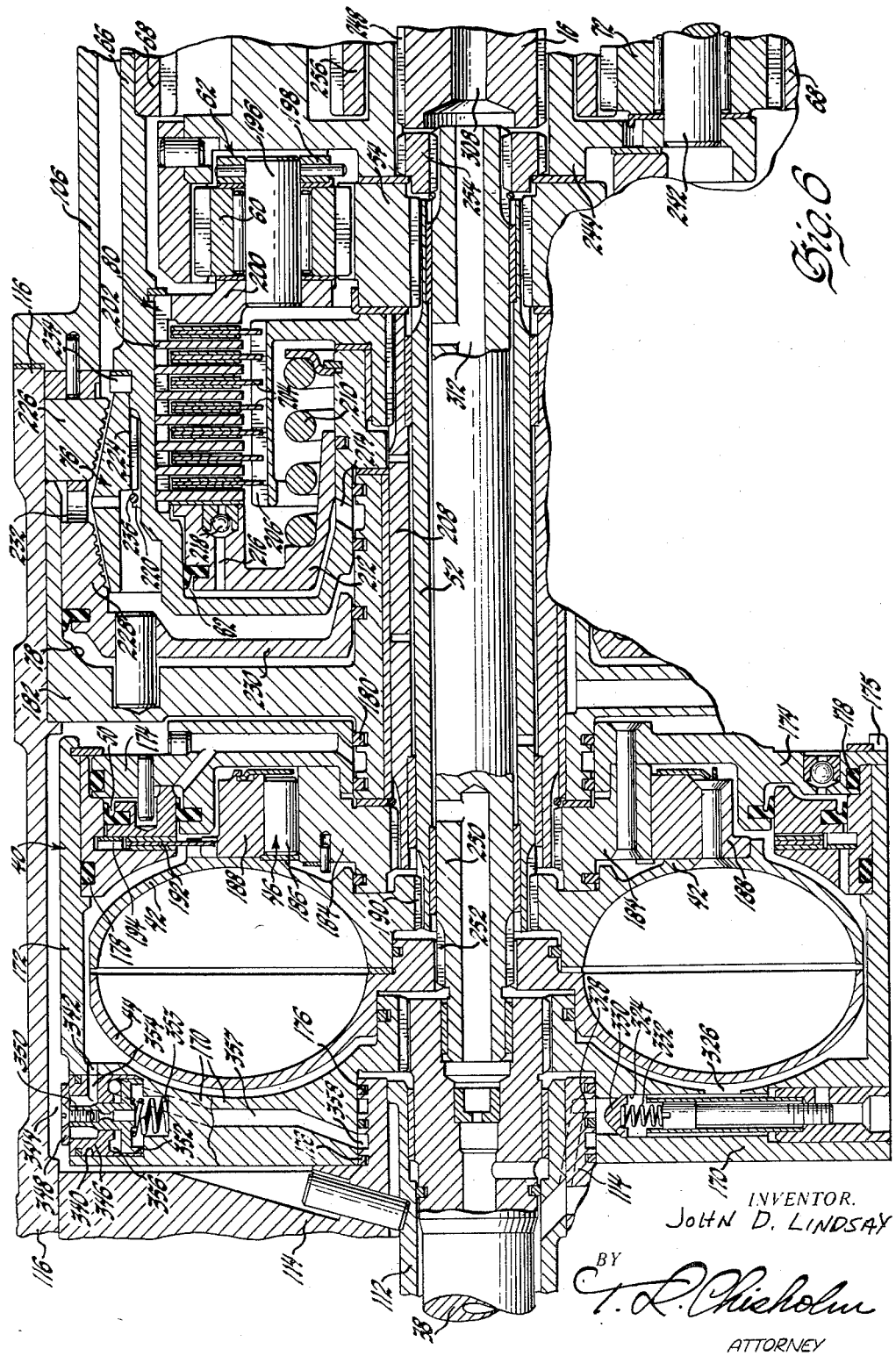

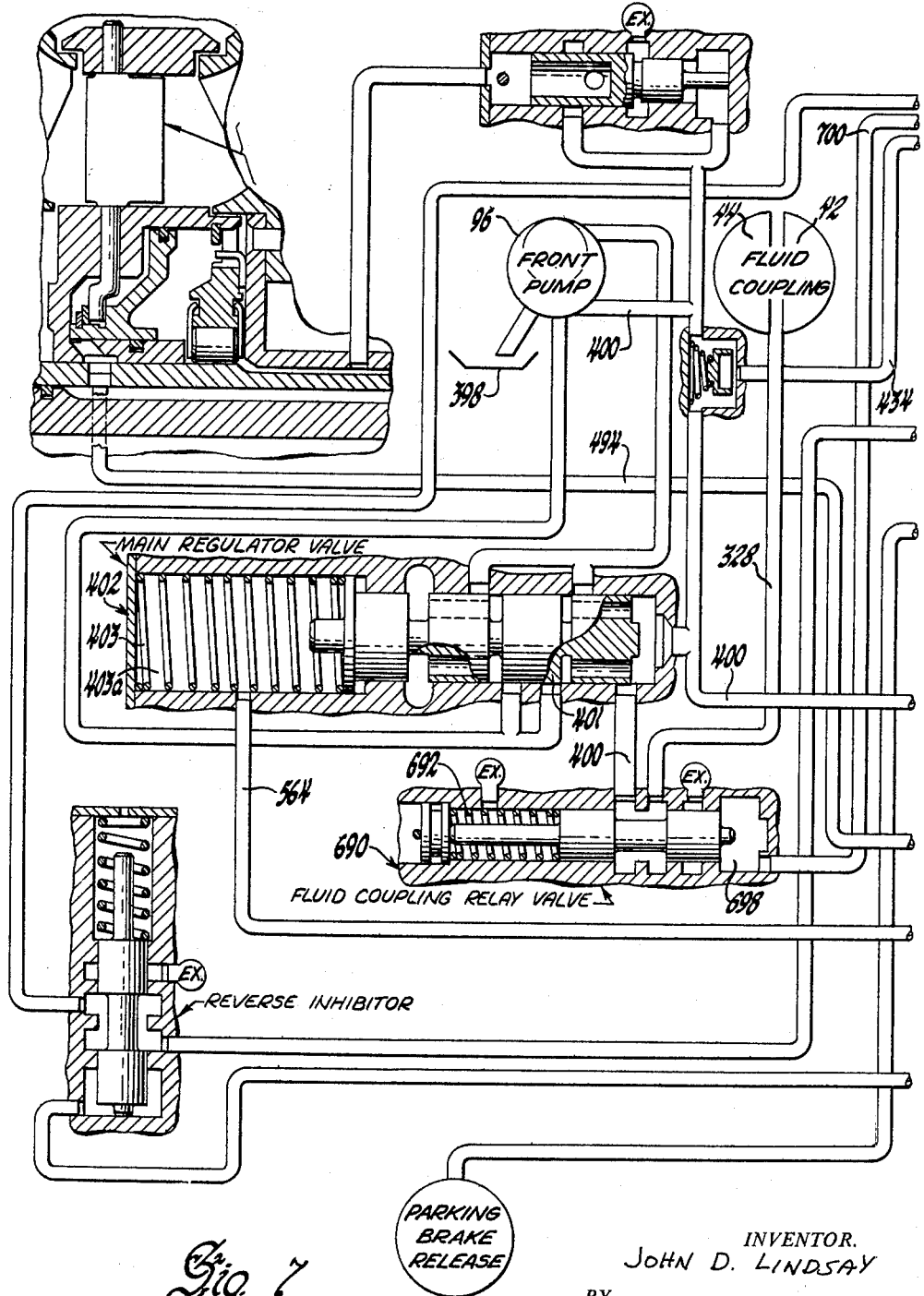

INVENTOR.
JOHN D. LINDSAY
BY
T. L. Chisholm
ATTORNEY

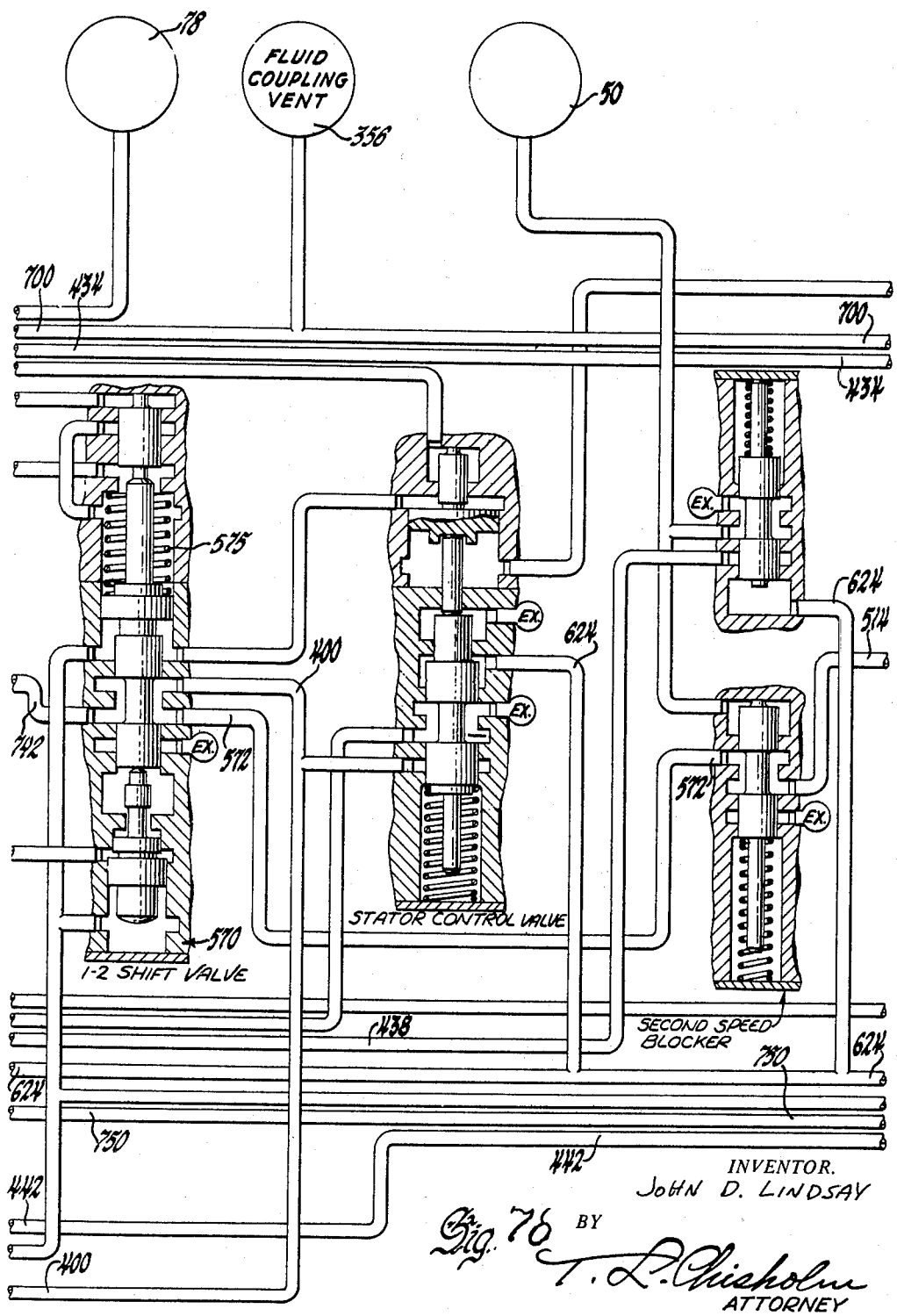

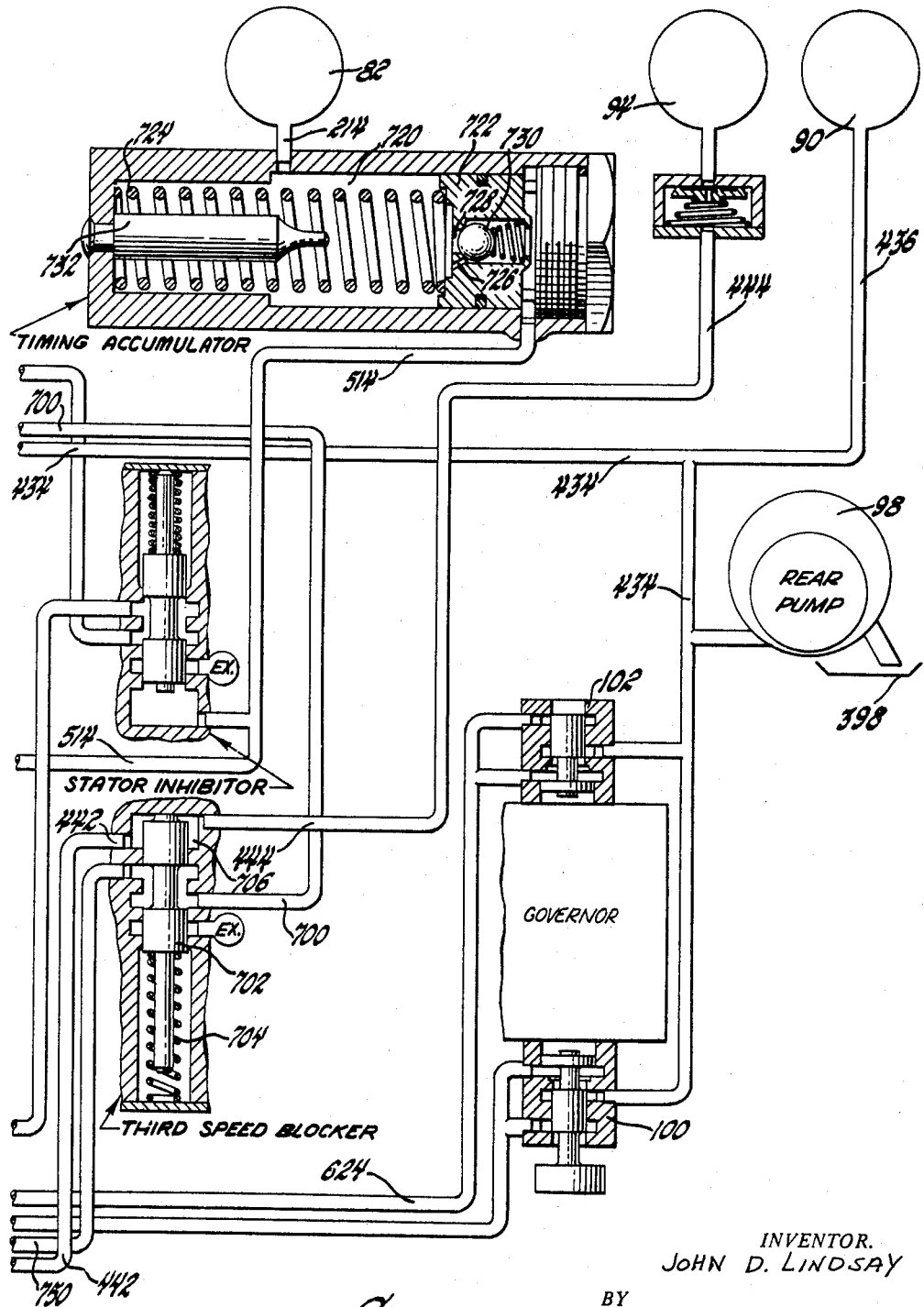

United States Patent Office 3,077,253
Patented Feb. 12, 1963

3,077,253
TRANSMISSION
John D. Lindsay, Birmingham, Mich., assignor to General Motors Corporation, Detroit, Mich., a corporation of Delaware
Original application Nov. 28, 1958, Ser. No. 777,112. Divided and this application Jan. 18, 1960, Ser. No. 2,944
5 Claims. (Cl. 192—85)

This is a division of my application Serial Number 777,112, filed November 28, 1958.

This invention relates to transmissions of the type in which a hydraulic torque transmitting device drives change-speed gearing which drives an output shaft at a plurality of forward speed ratios, and in reverse. It relates to novel features of construction and arrangement of the change-speed gear; to novel features of the connection between the change-speed gear and the hydrodynamic torque transmitting device; and to novel features of the hydraulic system for controlling the transmission.

In particular it relates to a clutch for establishing drive and to an improved timing device for controlling the rate of establishment of torque in the clutch. It also relates to a fluid coupling or fluid clutch for establishing drive and to improved means for controlling the filling and emptying of the fluid clutch and thus controlling the establishment of torque.

In the drawings:

FIG. 1 is one-half of a schematic, substantially symmetrical longitudinal section showing the functional relationship of the elements of a transmission embodying one form of the invention;

FIG. 2 is a diagram corresponding to FIG. 1 showing the change-speed which forms part of the transmission in first gear or low speed drive. In this and in FIGS. 3, 4 and 5, dotted lines indicate parts which are not active in the transmission of torque from the hydrodynamic torque transmitting device to the output shaft;

FIG. 3 is a diagram corresponding to FIG. 2 of the change-speed gearing in second gear or intermediate speed;

FIG. 6 is one-half of a substantially symmetrical longitudinal section of the actual construction of that part of one form of transmission embodying the invention which includes the fluid clutch and friction clutch;

Figure 4:
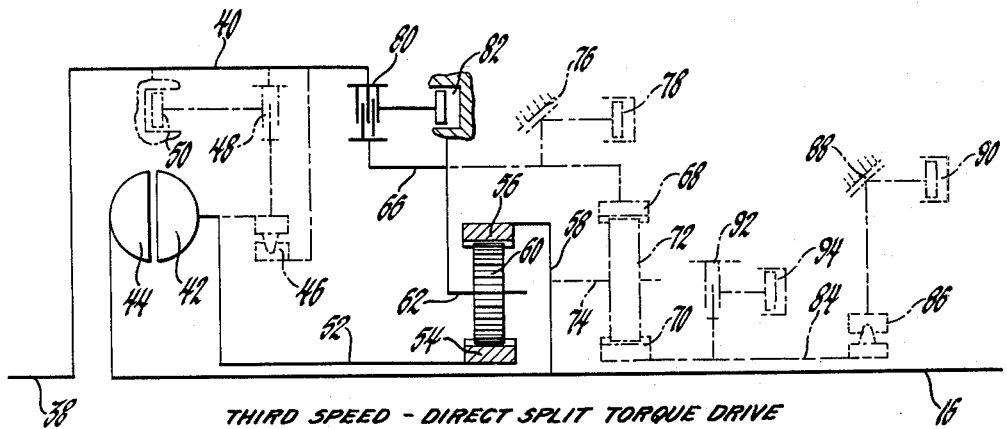
FIG. 4 shows the gearing in third speed or direct drive.

FIGS. 7, 7A, 7B and 7C, when put together in numerical order from left to right, collectively form a functional diagram of one form of hydraulic system for controlling the transmission shown in FIGS. 1 to 6, with the control set for third speed at above three-quarters throttle opening in the direct drive range in which the gearing can shift automatically among first, second and third speeds.

Referring to FIG. 1 the transmission input or driving shaft 10, which may be the crankshaft of the usual internal combustion engine, drives a hydrodynamic torque transmitting device 12 which in turn drives change-speed gearing 14 which drives an output shaft 16 which may be the propeller shaft of a conventional automobile. The hydrodynamic torque transmitting device may be, for example, a torque converter as disclosed in British Patent 770,599, published March 20, 1957, the disclosure of which is incorporated herein by reference. In this example the torque converter has an impeller 20 driven by the engine shaft 10, a first turbine $T_1$ and a second turbine $T_2$, through which the torque transfer fluid is successively circulated, and a reaction element, stator or guide wheel 22, the blade angles of which may be adjusted by any suitable mechanism 24, and which is connected to the frame of the transmission by a one-way brake 26 which permits the stator to rotate forward but prevents it rotating backward as is known in the art. The first turbine drives the input or ring gear 28 of a planetary gear set having planet gears 30 mounted on a carrier 32, and having a reaction sun gear 34 which is connected to the frame of a transmission by a one-way brake 36 which permits the sun gear to rotate forward but prevents it rotating backward as is known. The second turbine $T_2$ is connected through the carrier 32 to the torque converter output shaft 38 which forms the input or driving shaft for the gearing 14. The arrangement is such that the torque converter 12 transmits torque to the converter output shaft 38 at a ratio in respect to the torque on the input shaft 10, which ratio varies with the load on the output shaft 38. That is, when the shaft 38 is stationary or rotating at low speed which indicates high load, the torque ratio between shaft 38 and shaft 10 is high and may be of the order of three-to-one, whereas when the speed of the shaft 38 approaches the speed of the shaft 10 due to a decrease in load on the shaft 38, the torque ratio is near unity.

Shaft 38 is connected to a housing 40 which contains a fluid coupling including a turbine 44 connected to the output shaft 16 and an impeller connected by a hollow shaft 52 to a sun gear 54. The housing and the coupling may be selectively filled with oil or emptied to make the coupling effective or ineffective as will be explained. The housing 40 is connected to the sun gear by a one-way clutch 46 to drive the sun gear forward, but permit the sun gear to overrun or rotate forward faster than the housing 40. The housing 40 may be also connected to the sun gear by an anti-overrun clutch 48 which may be engaged by a hydraulic cylinder 50 to prevent the sun gear from overrunning. The purpose of this arrangement is to use the one-way clutch 46 to transmit the heavy driving torque from the torque converter to the sun gear and use the light clutch 48 to prevent free wheeling when the input to the gearing is through the sun gear, as it is in low forward speed and in reverse, and to let the sun gear 54 rotate forward faster than the housing 40 when the input to the gearing is not through the sun gear 54. Preferably the clutch 48 is small and capable of transmitting only a light torque, much less than the torque required to drive the car through the one-way clutch 46.

The input sun gear 54 is part of a front planetary gear set which includes a ring gear 56 connected by a flange 58 to the output shaft 16, and includes planet gears 60 meshing with the sun gear 54 and ring gear 56 and mounted on a carrier 62 which is connected by a drum 66 to the ring gear 68 of a second or rear planetary gear set. The rear gear set includes a reaction sun gear 70 and planet gears 72 meshing with the ring gear 68 and sun gear 70 and mounted on a carrier 74 which is connected to the flange 58 attached to the output shaft 16. The drum 66, front carrier 62 and the rear ring gear 68 may be held fast to establish reverse drive by friction member 76 which can be grounded by a cylinder 78. This friction device in this particular usage frequently or usually has been called a reverse clutch by engineers and manufacturers, but has been called a brake by others. This has been confusing to engineers who have been confining the term brake to something that stops the car and have been using the term clutch to refer to something that drives it. In attempting to use a generic term which will not conflict with either usage, I use the generic term friction torque-establishing device to refer both to friction clutches and to friction brakes.

Alternatively, the drum 66, carrier 62 and ring gear 68 may be connected to the fluid coupling housing 40 and to the input shaft 38 by a direct drive clutch 80 which may be set by a hydraulic cylinder 82. The rear reaction sun gear 70 is connected by a hollow shaft 84 through a one-way torque-establishing device 86 to a forward reaction friction torque-establishing device 88 which may be set by a hydraulic cylinder 90. This provides reaction torque for forward drive, as will be explained. Free-wheeling may be prevented by an over-run friction torque-establishing device 92 connected to the shaft 84, and settable by any suitable hydraulic cylinder 94.

Any suitable oil pump such as front pump 96 may be driven by the engine shaft 10 to provide a source of oil under pressure in response to rotation of the engine, for operating the controls of the transmission. Another oil pump 98 called the rear pump is driven by the output shaft 16 to provide a source of oil under pressure responsive to forward movement of the car. A low speed governor valve 100 and a high speed governor valve 102 may also be driven by an output shaft 16.

Referring to FIG. 2, to establish low or first speed drive between the torque converter output shaft 38 and the final drive shaft 16, the overrun friction torque-establishing device 48 is set, the forward reaction friction torque-establishing device 88 is set, the overrun friction torque-establishing device 92 is set, the direct drive friction torque-establishing device 80 and the reverse friction torque-establishing device 76 are released, and the fluid coupling 42—44 is emptied. The input shaft 38, through casing 40, one-way clutch 46 and shaft 52 drives the front input sun gear 54 at a speed, with relation to the speed of the engine shaft 10, that is determined by the torque converter 12. Initial resistance to movement of the car holds the shaft 16 stationary which temporarily holds the front ring gear 56 stationary to act as a reaction gear for the front planetary gear set. This causes the front carrier 62 to exert forward torque on the rear ring gear 68 and this exerts reverse torque on the sun gear 70 and forward torque on the carrier 74 and output shaft 16. Because the one-way clutch 86 and the forward reaction friction torque-establishing device 88 prevent reverse rotation of the sun gear 70, this drives the output shaft 16 forward at a reduced speed which takes advantage of the speed reductions effected by both the front and rear planetary gear sets. The overrun friction torque-establishing devices 48 and 92 prevent the car from free wheeling when the car tends to run faster than the engine would drive it.

Referring to FIG. 3, to set the gearing in second or intermediate speed, the overrun friction torque-establishing device 48 is released, fluid coupling 42—44 is emptied, the direct drive friction torque-establishing device 80 is set, the reverse friction torque-establishing device 76 is released, the overrun friction torque-establishing device 92 is set, and the forward reaction friction torque-establishing device 88 is set. The gearing input shaft 38 now drives the rear ring gear 68 through the casing of the fluid coupling 40, the direct drive friction torque-establishing device 80 and the drum 66. The rear reaction sun gear 70 is held against reverse rotation by the torque-establishing devices 86 and 88 as in low speed and this drives the carrier 74 and output shaft 16 at a speed reduction determined by the ratio of the rear planetary gear set 68—72—70, alone. The one-way clutch 46 lets the front sun gear 54 run faster than the casing 40 and carrier 62 and this lets the front planetary gearset 56—60—54 idle. Freewheeling on overrun is prevented by the friction torque-establishing device 92.

Referring to FIG. 4, provision is made for a third speed which is a direct drive with the input torque divided between mechanical drive and fluid drive. To establish third speed the fluid coupling 42—44 is filled, the overrun friction torque-establishing device 48 is released, the direct drive friction torque-establishing device 80 is engaged, the reverse friction torque-establishing device 76 is released, the overrun friction torque-establishing device 92 is released, and the forward reaction friction torque-establishing device 88 remains engaged but inactive, allowing sun gear 70 to turn forward, because of one-way device 86.

This drives the front carrier 62 by direct mechanical connection to the input shaft 38, the carrier now being the input member of the front planetary gear set. This gearset impresses forward torque on both the ring gear 56 and the sun gear 54, which latter through fluid coupling 42—44 impresses its torque on the output shaft 16. Thus the output shaft 16 is driven substantially at the speed of the input shaft 38, and the torque from the shaft 38 is divided by the front gearset into a mechanical component through ring gear 56 and a hydraulic component through sun gear 54. The ratio of the components is established by the ratio of the number of teeth in the ring gear to the number of teeth in the sun gear, the proportion through the sun gear being the smaller, as is known. Since the ring gear 56 and the turbine 44 necessarily turn at the speed of the shaft 16, and the sun gear 54 runs faster than the ring gear 56, the sun gear drives the impeller 42 faster than the speed of the casing 40, as permitted by the one-way clutch 46.

Figure 5:
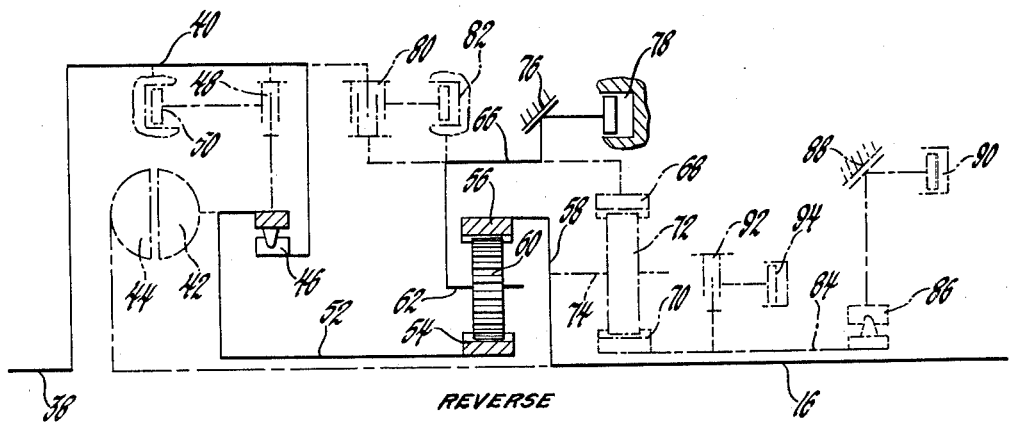
FIG. 5 shows the gearing in reverse.

Referring to FIG. 5 for reverse drive the overrun friction torque-establishing device 48, the direct drive friction torque-establishing device 80, the overrun friction torque-establishing device 92 and the forward reaction friction torque-establishing device 88 are all released, the fluid coupling 42—44 is emptied, and reverse friction torque-establishing device 76 is set. The torque converter output shaft 38 now drives the shaft 52 through the one-way clutch 46, and because the friction torque-establishing device 76 holds the carrier 62 the sun gear 54 drives the ring gear 56 backward which drives the output shaft 16 backward at low speed ratio.

*Structure*

FIG. 6 shows one form of actual structure of the fluid coupling 41—42 and the clutch 80 with their associated parts in a transmission embodying the invention.

As shown at the left of FIG. 6 the rear or right end of the torque converter output shaft 38 rotates in a stationary casing 112—114—116 and is keyed or splined to a front radial flange 170 formed integral with an outer cylindrical drum 172 which is keyed to a rear radial flange 174 as by teeth 175 shown at the bottom of the drawing. The flanges and drum together constitute the fluid coupling casing 40 which is at times to be filled with oil under pressure. In order to contain the oil in the casing the front flange 170 has a rotating seal connection 176 with a sleeve forming part of the stationary wall 114 and the rear flange 174 is sealed to the drum 172 by a gasket 178, shown at the bottom of the drawing, and has a rotating sealing connection 180 with a flange on a stationary wall 182, forming part of the casing 116.

The front flange 170 contains control valves, which will be described, for admitting and releasing oil from the casing 40.

As shown in the lower half of the drawing, the rear flange 174 is riveted to the inner race 184 of the one-way clutch 46 whose rollers or sprags 186 engage a cam ring or outer race 188 of known form riveted to the impeller 42 of the fluid coupling 42—44. The impeller is splined at 190 to the gearing input shaft 52. The one-way clutch 46 is arranged so that forward rotation of the casing 40 drives the impeller, but the impeller can rotate forwardly faster than the casing 40. The impeller 42 and outer race 188 are also splined to the driving plate 192 of the over-run clutch 46 which may be set by the piston 194 when oil under pressure is admitted to the cylinder 50. This locks the impeller to the casing 40 so that the car can drive the engine which thus serves to brake the car.

The gearing input shaft 52 is keyed at its rear or right end, as FIG. 6 is seen, to the front input sun gear 54 which meshes with the planets 60 journalled on spindles 196 forming part of the carrier 62 and supported in a rear cheek plate 198 and a front cheek plate 200 keyed to the drum 66 and splined to the driven plates 202 of the direct drive clutch 80. The driving plates 204 of the clutch 80 are splined to a clutch hub 206 splined to the rear end of a hollow shaft 208, the front end of which is splined to the rear flange 174 of the fluid coupling casing 40 so that the driving plates 204 are driven by the torque converter output shaft 38. The main clutch 80 is normally disengaged by a release spring 210 which constantly urges to the left a clutch apply piston 212 which can be moved to the right to engage the clutch by the pressure of oil admitted to the cylinder 82 through a control passage 214 near the center of the cylinder, formed integral with the drum 66. In order to insure release of the clutch and prevent the building up of centrifugal pressure in the chamber 82 when the pressure in the passage 214 is released, the piston is provided near its rim with the release passage 216 and a centrifugal dump valve 218 which may be constructed as shown in the U.S. patent to Harold Fischer 2,740,512, the disclosure of which is included herein by reference.

As shown in FIG. 6 the turbine 44 of the fluid coupling 42—44 is connected to the output shaft 16. For mechanical convenience this connection is formed by a shaft 250 secured at its front end to the turbine 44 by a spline 252, and splined at its rear end to the interior of a ring 254, the outside of which is splined to the front cheek plate 244 of the carrier 74 and so is connected to the output shaft 16. The planet gears 72 mesh with the reaction sun gear 70 which is formed integral with a short hollow shaft 256 rotatably supported on the output shaft 16 in any suitable manner.

As shown in the lower part of FIG. 6 the front flange 170 of the fluid coupling housing 40 has a bore 324 which can fill the casing 40 and fluid coupling 40—42 through an opening 326 from an oil supply passage or gland 328 in the stationary wall 114. The bore 324 contains an inlet valve 330 urged closed by a spring 332 to prevent communication between the gland 328 and the interior of the fluid coupling. Whenever the fluid coupling is to be filled, oil under pressure is supplied by the control system to the gland 328, the pressure opens the valve against the force of spring 332 and oil flows into the coupling. The spring 332 has sufficient force to hold the valve closed against centrifugal force.

As shown in the upper half of FIG. 6 the front flange 170 also has an outlet bore 340 leading from a vent passage 342 of the fluid coupling to the space 344 surrounding the fluid coupling casing 40 which communicates with the usual sump forming part of the casing 116, which is substantially at atmospheric pressure, as is known. The outlet bore 340 contains a fixed valve sleeve 346 which guides a reciprocal valve assembly, including valve cap 348 mounted on a stem 350 integral with a piston 352 slidable in the sleeve. A spring 353 normally urges the valve outward, that is upward as FIG. 6 is seen so that the valve cap vents the coupling to the space 344 through the passage 354 matching the vent opening 342. The space between the sleeve 346 and the piston 352 forms a valve closing chamber 356 which is in communication with the passage 357 in the flange 170 which in turn is in communication with a gland 358 in the wall 114 to which oil under pressure may be admitted from the control system to urge the piston 352 inwardly against the spring to close the exhaust valve. Whenever the fluid coupling is to be filled oil under pressure is supplied from the control system to the gland 358 to close the exhaust valve 348 and oil under pressure is admitted to the inlet passage 326 to open the inlet valve 330 and supply fluid to fill the coupling, as will be explained below in the discussion of the control system. In order to empty the fluid coupling, the control system cuts off fluid from the passages 326 and 358. The spring 352 then opens the vent valve and the fluid is drained from the coupling by centrifugal force. Preferably a number of inlet valves and exhaust valves like those shown in FIG. 6 are disposed about the circumference of the flange 170 in order to effect rapid filling and emptying of the coupling.

Control System

As more fully disclosed in my parent application, Serial Number 777,112, in general the control system includes the front and rear pumps 96 and 98 which constitute reservoirs or sources of control oil under pressure whenever the engine is running or the car is moving forward; a manually operated selector valve which determines whether the transmission will drive the car forward or backward, and if forward, whether it will be held in first speed, or will be permitted to upshift automatically to second speed only or to second and third speeds; a pump pressure regulator which normally maintains a constant pump pressure but which can be influenced by various modifiers or modulators to change the pressure as may be required by different driving conditions; a clutch shift valve for selectively setting or releasing the direct drive clutch 48; a fluid coupling shift valve for selectively filling and emptying the fluid coupling; a stator control valve for placing the stator blades in either high or low angle; and various relay, blocker or inhibitor valves which permit or prevent operation of other elements of the control system in accordance with the requirements of automatic and manual gear ratio selection. The shift valves are urged to shift up by governor-generated pressure as the speed of the car increases and are urged to shift down by pressure representing torque or power demand as indicated by throttle opening.

Referring to FIGS. 7, 7A, 7B, 7C, the front pump 96 takes in oil from a sump 398, customarily formed by a portion of the transmission casing 116, and discharges oil under pressure to a main line 400. The pressure of the main line urges to the left in FIG. 7 the valve stem 401 of a pressure regulator valve generally designated by 402, against the force of a return spring 403 in a pressure chamber 403a. As disclosed in the Herndon Patent 2,763,162 this arrangement maintains a constant pressure in the main line 400 when there is a constant pressure or no pressure in the chamber 403a, but the pressure of the main line can be changed by changing the pressure in the chamber 403a.

As shown in FIGS. 2–5 the direct drive clutch 80 is engaged both in second speed (FIG. 3) and third speed (FIG. 4) but in no other speed, and the fluid coupling 42—44 is filled to transmit torque only in third speed.

Figure 7A:
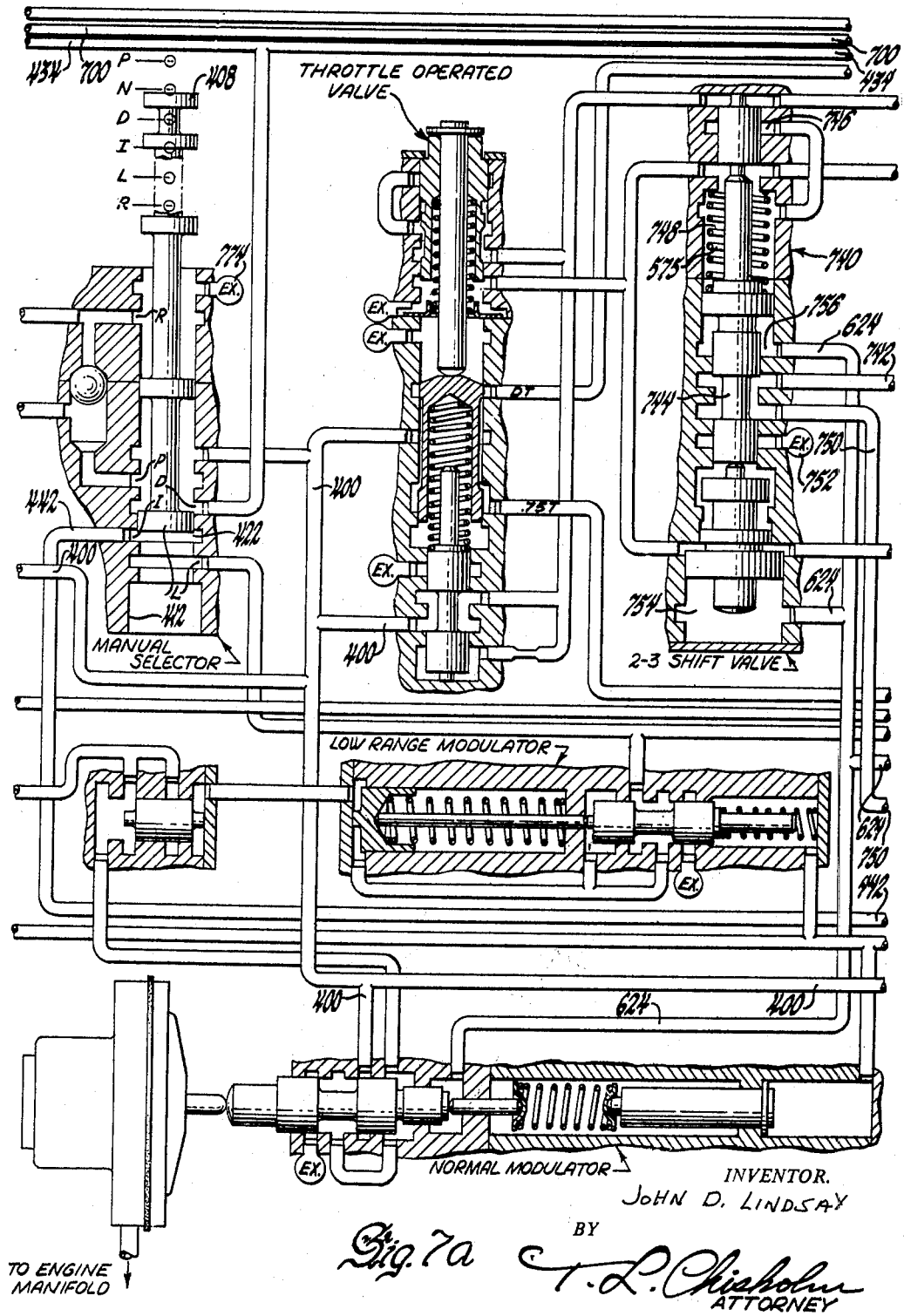

Referring to FIGS. 7, 7A, 7B, 7C, in order to drive the car in direct drive range in which first, second and third gear is selected automatically in accordance with speed and torque conditions, the manual valve stem 408 is placed in the D for drive position, as shown in FIG. 7A. This vents the intermediate range control line 442 through intermediate port 422 and vent port 412 of the manual valve, and so vents the closing chamber 706 of the 3rd speed blocker valve 702 (FIG. 7C), permitting this valve to be opened by the spring 704 so that the fluid coupling 42, 44 can be filled as will be explained. Venting the intermediate control line 442 also vents the line 444 and consequently vents the overrun friction torque-establishing device apply chamber 94 to release the overrun friction torque-establishing device 88. Otherwise the controls are now conditioned for drive in first and second speed. The throttle is closed and low gear drive is established by pressurizing the forward reaction friction torque-establishing chamber 90 through lines 434 and 436, (FIGS. 7A, 7C), leading from open drive port 420 on the selector valve 406 (FIG. 7A) connected to main line 400. When the throttle is opened the transmission will start in first gear and will shift up into second gear as car speed increases as more fully described in the parent application S.N. 777,112.

It is noted that when the transmission control is set for either intermediate or direct drive range the forward reaction friction torque-establishing device apply chamber 90 is pressurized to establish low gear drive and the direct clutch chamber 82 is pressurized by the 1-2 shift valve 570 automatically in response to driving conditions. When the fluid coupling 42—44 is filled the third speed drive is picked up without releasing the low speed reaction friction torque-establishing device 88 and the sun gear 70 overruns the friction torque-establishing device 88 because of the one-way clutch 86. In order to effect a smooth transition from first gear to second gear drive the direct clutch chamber 82 is filled gradually to engage the clutch 80 gently. This may be accomplished by any suitable timing or cushioning device. I prefer to use the accumulator and timing valve arrangement shown in FIG. 7C. This includes an expansible chamber 720 closed by a piston 722 urged to the right by a spring 724 and urged to the left by the difference in pressure between lines 514 and 214. The piston has a slow flow passage 726 which always connects lines 514 and 214, and a fast flow passage 728 normally closed by a ball check valve 730, which can be pushed off its seat by a pin 732 to open the fast flow passage.

Whenever the direct clutch apply line 514 is first pressurized the direct clutch chamber 82 and the chamber 720 have been vented and consequently these spaces are at low pressure. The line pressure in the passage 514 pushes the piston 722 to the left so that pin 732 opens the fast flow passage 728 and oil flows rapidly through the passage 728 to fill the reduced volume of the chamber 720 and the clutch chamber 82. It is intended that this space will be filled quickly at sufficient pressure to take up clearance between the clutch plates 202 and 204 of the clutch 80. When the clearance is taken up the clutch chamber 82 stops expanding so that the pressure in the clutch chamber 82 and space 720 will tend to increase suddenly, which if permitted would cause the clutch to grab and give a rough shift. This is prevented by the expansion of the chamber 720. As soon as the slack is taken up the increase of pressure in chamber 720 moves the piston 722 away from the pin 732, seating the ball and closing the fast-flow passage 728. After that oil flows slowly thru the slow flow passage 726 and gradually builds up pressure in the clutch chamber 82 and in the expanding accumulator chamber 720. Consequently full torque capacity of the clutch 80 is established gradually. This makes a gentle transition from first speed drive to second speed drive.

When transmission is shifting down from second speed to first speed the line 514 is vented and the check valve 730 opens to permit rapid release of the clutch 80. This is desirable to give the engine time to speed up to the higher speed required for first gear drive, as is known. Since first speed is established as soon as the one-way clutch 86 locks up, this arrangement provides a smooth downshift.

After the speed and torque conditions establish second gear drive as described, further increase in car speed establishes third speed drive through the action of a 2-3 shift valve 740 shown in FIG. 7A. This shift valve is held closed, or downshifted, when there is no pressure in the control system, by a light spring 575, in order to insure the valve being closed when the system is started, at which time there may be zero throttle pressure. As soon as the 1-2 shift valve 570 has opened or upshifted, the main line 400 is connected to a supply passage 742 leading to the 2-3 shift valve 740. At low speed or at relatively high torque demand the valve stem 744 of the 2-3 shift valve 740 is held closed, as shown in FIG. 7A by the spring 575 and/or TV pressure in closing or downshift chambers 746 and 748. With the valve closed, the line 742 is blocked by the valve stem 744 and a third speed control line 750 is vented at exhaust port 752. The valve stem 744 is urged to open or upshift by upshift chambers 754 and 756 supplied with governor pressure from the line 624. At some given throttle opening the governor pressure at some predetermined car speed is sufficient to move the valve stem 744 up against TV pressure in chambers 746 and 748 to close the vent 752 and connect main line pressure from 742 to the third speed control line 750. This upshift always occurs after upshift of the 1-2 valve 570 so that the line 742 is supplied with main line pressure. When the valve 744 upshifts, the third speed control line 750 is pressurized, and since third speed blocker valve 702 is open, this pressurizes the line 700 and pressurizes closing chamber 356 of the fluid coupling vent valve 348 (FIGS. 6, 7B). This closes the vent valve. The line 700 also opens the fluid coupling relay valve 690 (FIG. 7) by pressurizing the chamber 698 and this connects main line 400 to the fluid coupling filling passage 328 (FIGS. 6 and 7). This fills the fluid coupling to establish third speed or direct split torque drive as described in connection with FIG. 4. The forward reaction friction torque-establishing device 88 remains set but the one-way clutch 86 freewheels as permitted by the overrun friction torque-establishing device 92.

Increase of throttle opening at a given speed or decrease of speed at a given throttle opening will cause the 2-3 shift valve 740 to downshift to establish second speed drive by venting the third speed control line 750 at exhaust port 752 which vents the vent valve closing cylinder 356 permitting the fluid coupling vent valve 348 to be opened by the spring 353 (FIG. 6). Venting of the line 700 also permits the fluid coupling relay valve 690 to be closed by its spring 692 to cut off supply of oil from the main line 400 to the fluid coupling filling passage 328 (FIGS. 6, 7).

I claim:

1. A power transmission comprising in combination, a friction torque-establishing device for establishing a driving connection between driving and driven members; an engaging chamber for receiving fluid under pressure to establish in the torque-establishing device torque measured by the pressure in the engaging chamber; and means for controlling the rate of establishment of torque in the torque-establishing device including a control chamber connected to the engaging chamber, a fluid pressure supply conduit, a constantly open slow flow passage and a fast flow passage both connected to conduct fluid from the conduit to the control chamber, means constantly tending to close the fast-flow passage, and means responsive to initial existence of pressure in the supply conduit for opening the fast-flow passage, said closing means being responsive to excess of pressure in the control chamber over pressure in the supply conduit for opening the fast-flow passage.

2. A power transmission comprising in combination, a friction torque-establishing device for establishing a driving connection between driving and driven members; an engaging chamber for receiving fluid under pressure to establish in the torque-establishing device torque measured by the pressure in the engaging chamber; and means for controlling the rate of establishment of torque in the torque-establishing device including a control chamber connected to the engaging chamber, a fluid pressure supply conduit, a constantly open slow-flow passage and a fast-flow passage both connected between the conduit and the control chamber, means constantly tending to close the fast-flow passage, means responsive to initial existence of pressure in the supply conduit for opening the fast-flow passage and means subsequently responsive to a predetermined difference in pressure between the control chamber and the supply conduit for closing the fast-flow passage, said closing means being responsive to excess of pressure in the control chamber over pressure in the supply conduit for opening the fast-flow passage.

3. A power transmission comprising in combination, a friction torque-establishing device for establishing a driving connection between driving and driven members; an engaging chamber for receiving fluid under pressure to establish in the torque-establishing device torque measured by the pressure in the engaging chamber; and means for controlling the rate of establishment of torque in the torque-establishing device including an expansible and contractible control chamber connected to the engaging chamber, a fluid pressure supply conduit, means responsive to initial existence of pressure in the conduit for reducing the volume of the control chamber, means responsive to a predetermined reduction of volume of the control chamber for establishing communication between the conduit and the chambers at a predetermined rate of flow and means subsequently responsive to a predetermined difference of pressure between the chambers and the conduit for reducing the rate of flow into the control chamber to expand the control chamber at a slow rate.

4. A power transmission comprising in combination, a friction torque-establishing device for establishing a driving connection between driving and driven members; an engaging chamber for receiving fluid under pressure to establish in the torque-establishing device torque measured by the pressure in the engaging chamber; and means for controlling the rate of establishment of torque in the torque-establishing device including an expansible and contractible control chamber connected to the engaging chamber, a fluid pressure supply conduit, a movable piston forming one wall of the control chamber and means responsive to initial existence of pressure in the conduit for reducing the volume of the control chamber, means responsive to a predetermined movement of the piston for establishing communication between the conduit and the chambers at a predetermined rate of flow and means subsequently responsive to a predetermined difference of pressure between the chambers and the conduit for reducing the rate of flow and thereby expanding the control chamber at a slow rate.

5. A power transmission comprising in combination, a friction torque-establishing device for establishing a driving connection between driving and driven members; an engaging chamber for receiving fluid under pressure to establish in the torque-establishing device torque measured by the pressure in the engaging chamber; and means for controlling the rate of establishment of torque in the torque-establishing device including a control chamber including a movable piston the position of which determines the volume of the control chamber, a spring constantly urging the piston to increase the volume of the chamber, a fluid pressure supply conduit, the piston being responsive to pressure in the conduit to tend to move in the direction decreasing the volume of the control chamber, a fast flow passage and a slow flow passage through said piston connecting said conduit and said control chamber, a valve normally closing the fast flow passage, and means responsive to a predetermined movement of the piston due to pressure in the conduit for opening the valve to increase the pressure in the control chamber, said controlling means being responsive to a predetermined difference of pressure between the conduit and the control chamber for moving the piston in the direction to increase the volume of the control chamber to close the valve.

References Cited in the file of this patent

UNITED STATES PATENTS

| | | |
|---|---|---|
| 918,652 | Bryan | Apr. 20, 1909 |
| 2,702,618 | Baker et al. | Feb. 22, 1955 |
| 2,721,640 | De Feo et al. | Oct. 25, 1955 |
| 2,785,583 | Kelbel | Mar. 19, 1957 |
| 2,861,589 | Ostwald | Nov. 25, 1958 |
| 2,886,065 | Hershman | May 12, 1959 |